UNITED STATES PATENT OFFICE.

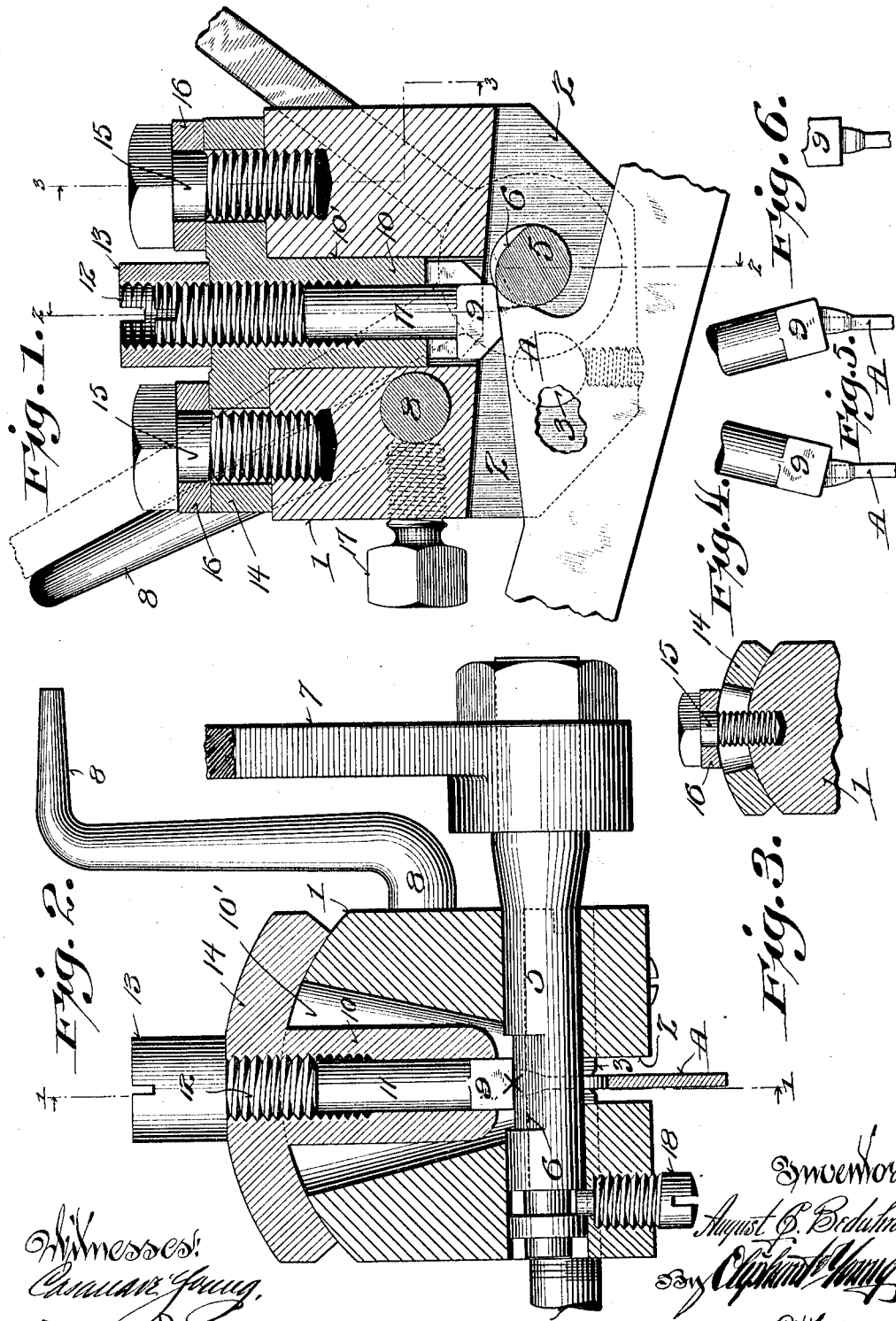

AUGUST J. BEDUHN, OF OSHKOSH, WISCONSIN.

SAW-SWAGE.

1,040,997.  Specification of Letters Patent.  Patented Oct. 15, 1912.

Application filed May 26, 1911. Serial No. 629,734.

*To all whom it may concern:*

Be it known that I, AUGUST J. BEDUHN, a citizen of the United States, and resident of Oshkosh, in the county of Winnebago and State of Wisconsin, have invented certain new and useful Improvements in Saw-Swages; and I do hereby declare that the following is a full, clear, and exact description thereof.

My invention refers to saw swages, its object being to provide an anvil for such devices having its face capable of transverse adjustment relative to the saw-blade, the adjustment being about an axis of oscillation that is located upon an approximate plane common to the working faces of the anvil and die members whereby swaging of the point of a saw tooth may be either at a right angle to the blade or deflected obliquely to the right or left at the will of the operator. The transverse adjustment of the face of the anvil also eliminates truing of said face incidental to wear and hence it follows that should the face of the anvil be imperfectly finished or ground, whereby it is not upon a parallel plane with the die-member, the defect can quickly be corrected by slight adjustment so as to bring said faces in parallel alinement if desired. Thus a straight tooth can be formed even though the working faces of the die and anvil faces are not normally parallel.

With the above object in view my invention consists in what is herein shown, described and claimed.

In the drawings Figure 1 represents a longitudinal sectional view of a swage embodying the features of my invention, the section being indicated by line 1—1 of Fig. 2; Fig. 2, a cross-section of the same as indicated by line 2—2 of Fig. 1; Fig. 3, a detail cross-section as indicated by line 3—3 of Fig. 1, the section showing the means for locking the die in its transverse adjustment; Figs. 4 and 5 represent diagram views of the anvil disposed at opposite angles relative to the vertical plane of the saw-blade whereby the point of the tooth is swaged to the right or left, and Fig. 6, a similar view illustrating the anvil in the same vertical plane as the saw, in which position the swage upon the tooth is formed at a right angle to its vertical plane.

Referring by characters to the drawings, 1 represents a block provided with a longitudinal channel 2 for the reception of the saw-blade tooth, said tooth being held in position for swaging between the end of a stud 3 and a clamping-screw 4, a saw-tooth A being shown in its adjusted position in Figs. 1 and 2.

Journaled in transverse apertures of the block is an oscillatory die-member 5 having an eccentric swaging face 6 which is arranged to form the bite at the point of the saw tooth, the die being rotated by means of a crank 7 which is limited in its movement when thrown to its normal position by a stop finger 8, the anvil being shown in Fig. 1 in its working position with its eccentric face advanced forward whereby the bite is formed upon the point of the saw tooth which, as shown, has its upper edge abutting the working face of an anvil member 9. The working faces of the anvil and die-members are normally upon a parallel plane in which position the point of the tooth is swaged squarely across or at a right angle to the vertical plane of the saw-blade. The anvil member 9 preferably comprises a rectangular head portion which is seated within the recessed end of a sleeve 10, there being a shank 11 of the anvil member fitted into the sleeve whereby said anvil member may be adjusted vertically, the adjustment being effected by a screw-plug 12 which is in threaded engagement with the sleeve and adapted to impinge against the end of the anvil shank, the threaded plug being held in its adjusted position by a threaded locking collar 13. The sleeve 10 is seated in a vertically flared aperture 10' that is formed in the block whereby said sleeve may be adjusted transversely together with the anvil.

In order to obtain the best results in swaging the anvil is arranged to be adjusted transversely upon an axial point that is approximately alined with the working faces of the anvil and die members, said point being upon an imaginary vertical line running through the center of the saw-blade, the point being indicated at $x$ in Fig. 2. In order that the working face of the anvil may rock about this point transversely of the saw-blade the block is formed with a circular upper face, which face is struck from the point of oscillation indicated at $x$, the sleeve being supported upon this circular face by a flange-cap 14, which cap is provided with a concave face that matches the convex contour of the block and thus it will be seen that the anvil which is carried by the sleeve can be rocked about its point of oscillation.

The anvil is held in its adjusted position with relation to the block by means of a pair of cap-screws 15 which are in threaded engagement with said block and pass through transverse slots in the cap 14, there being washers 16 interposed between the cap 14 and heads of the cap-screws whereby said cap is securely gripped. The stop-finger 8 is provided with a shank that extends at right-angles thereto, which shank is fitted through an aperture in the block and held by suitable stud-bolts 17 whereby the position of the finger may be adjusted. The eccentric die is held against lateral play in its journals by means of a set-screw 18 having a reduced stem portion that engages an annular recess in said die.

Heretofore, I am aware, that swages of this character have been in use, but the anvil-members of such swages were transversely fixed with relation to the working face of the dies and hence when the anvil face became worn or was improperly ground the swaging point of the tooth of a saw would be deflected toward one side in place of being straight as is generally desired and in that case the face of the anvil would have to be reground to suit the requirement of the special tooth. Hence, if it was desired to swage a tooth in the opposite direction or upon a different angle, this grinding operation would again have to be resorted to.

The above objectionable features have been entirely overcome with my improved device whereby the working face of the anvil is adjusted transversely of the saw-blade.

From the foregoing description it will be readily understood that if it was desired to swage the point of the teeth to the left the anvil would be rocked about its axis to the right as shown in Fig. 4, while if the opposite angle was required the position would be reversed as shown in Fig. 5; and Fig. 6 illustrates the anvil in a straight swaging position whereby the point of the tooth is evenly swelled and the top face is disposed at a right angle to the blade.

I claim:

1. In a saw swage having a block, an oscillatory die transversely journaled in the block, the die being provided with an eccentric working face, a saw-clamping means carried by said block and a vertically disposed anvil having a working face upon the same plane as the working face of the die; the combination of a transversely oscillatory supporting means for the anvil, its axis of oscillation being upon the same horizontal plane as the working faces of the anvil and die said point of oscillation intersecting an imaginary vertical line passing through the saw tooth upon which said members are adapted to operate, and locking means for the oscillatory anvil support.

2. A saw-swage comprising an apertured block, a transversely disposed oscillatory die mounted therein, the die-carrying block being provided with a transversely disposed circular face that is described about the working point of the die, a transversely disposed oscillatory sleeve-carrying anvil fitted within the die-block aperture, a concave faced cap extending from the sleeve in engagement with a circular face of the block, and means for adjusting the cap-sleeve transversely of the circular face of the block whereby the central point of the lower face of the anvil will remain fixed relative to a common working point of the die, and means in connection with the block and sleeve-cap for securing the anvil in its transversely adjusted position.

In testimony that I claim the foregoing I have hereunto set my hand at Oshkosh in the county of Winnebago and State of Wisconsin in the presence of two witnesses.

AUGUST J. BEDUHN.

Witnesses:
JULIUS H. BEUTLER,
ARNO STEPHAN.

---

Copies of this patent may be obtained for five cents each, by addressing the "Commissioner of Patents, Washington, D. C."